US009515522B2

(12) United States Patent
Cofta et al.

(10) Patent No.: US 9,515,522 B2
(45) Date of Patent: Dec. 6, 2016

(54) METHOD AND APPARATUS FOR SECURE ENERGY DELIVERY

(75) Inventors: Piotr Cofta, Suffolk (GB); Colin Thomas Mallett, Suffolk (GB)

(73) Assignee: TRUSTED RENEWABLES LIMITED, Saxmundham, Suffolk (GB)

( * ) Notice: Subject to any disclaimer, the term of this patent is extended or adjusted under 35 U.S.C. 154(b) by 352 days.

(21) Appl. No.: 13/143,374

(22) PCT Filed: Jan. 6, 2010

(86) PCT No.: PCT/GB2010/000011
§ 371 (c)(1),
(2), (4) Date: Sep. 22, 2011

(87) PCT Pub. No.: WO2010/079325
PCT Pub. Date: Jul. 15, 2010

(65) Prior Publication Data
US 2012/0035871 A1     Feb. 9, 2012

(30) Foreign Application Priority Data

Jan. 6, 2009 (GB) .................................. 0900082.9

(51) Int. Cl.
G06F 19/00 (2011.01)
G01R 21/133 (2006.01)
(Continued)

(52) U.S. Cl.
CPC ..... *H02J 13/0075* (2013.01); *H01L 31/02021* (2013.01); *H01L 31/042* (2013.01);
(Continued)

(58) Field of Classification Search
CPC ............. H01L 31/02021; H01L 31/042; H02L 13/0075; Y02E 10/50; Y02E 60/7861; Y02E 60/7853; Y02E 40/72; Y04S 10/123; Y04S 40/126; Y04S 40/127; H02S 50/00; H02J 13/0075
See application file for complete search history.

(56) References Cited

U.S. PATENT DOCUMENTS 7,188,003 B2   3/2007 Ransom
7,412,338 B2   8/2008 Wynans et al.
(Continued)

FOREIGN PATENT DOCUMENTS

JP   2002/149060   5/2002
JP   2002-149060   5/2002
(Continued)

OTHER PUBLICATIONS

Secure and Authenticated Delivery of Metered and/or Energy information Data Via Untrusted Networks, Jan. 2, 2007, IP.com, IPCOM000144615D, pp. 1-6.*
(Continued)

*Primary Examiner* — Sujoy Kundu
*Assistant Examiner* — L. Anderson
(74) *Attorney, Agent, or Firm* — Nixon & Vanderhye P.C.

(57) ABSTRACT

A solar power conversion device has an embedded security module for creating trusted metering data in relation to power generated and for delivering it to a metering data output. The security module might for example be constructed as an integrated circuit card constructed using semiconductor chip fabrication and assembly techniques to be integral with the solar power conversion device. The device might comprise more than one solar cell mounted on a panel to form an array. There may further be provided a panel management module for collating data, for instance from multiple cells, prior to transmission over a network via the metering output. The panel management module might comprise for example a subscriber identity module and the metering data output may provide associated mobile tele- (Continued)

phone endpoint technology so that the metering data can be transmitted over an air interface.

24 Claims, 11 Drawing Sheets

(51) Int. Cl.
*H02J 13/00* (2006.01)
*H01L 31/042* (2014.01)
*H01L 31/02* (2006.01)
*G01R 31/40* (2014.01)

(52) U.S. Cl.
CPC ............... *H02S 50/00* (2013.01); *Y02E 10/50* (2013.01); *Y02E 40/72* (2013.01); *Y02E 60/7853* (2013.01); *Y02E 60/7861* (2013.01); *Y04S 10/123* (2013.01); *Y04S 40/126* (2013.01); *Y04S 40/127* (2013.01)

(56) References Cited

U.S. PATENT DOCUMENTS

| | | | |
|---|---|---|---|
| 7,673,337 B1* | 3/2010 | Osburn et al. | 726/12 |
| 8,053,929 B2* | 11/2011 | Williams et al. | 307/82 |
| 2004/0193329 A1 | 9/2004 | Ransom | |
| 2004/0211456 A1 | 10/2004 | Brown | |
| 2005/0206530 A1 | 9/2005 | Wynans | |
| 2005/0269401 A1* | 12/2005 | Spitzer et al. | 235/380 |
| 2006/0085167 A1 | 4/2006 | Warfield et al. | |
| 2006/0162772 A1 | 7/2006 | Presher, Jr. | |
| 2008/0295880 A1* | 12/2008 | Skryabin et al. | 136/244 |
| 2008/0306700 A1 | 12/2008 | Kawam | |
| 2009/0157545 A1* | 6/2009 | Mobley | G06Q 20/102 705/40 |
| 2009/0242011 A1 | 10/2009 | Proisy | |
| 2010/0132765 A1* | 6/2010 | Cumpston | H01L 31/035281 136/249 |
| 2010/0224227 A1* | 9/2010 | Lindsey | 136/244 |
| 2011/0004764 A1* | 1/2011 | Stuber | 713/176 |
| 2011/0050002 A1* | 3/2011 | De Luca | 307/149 |
| 2012/0169476 A1* | 7/2012 | Ota et al. | 340/10.5 |

FOREIGN PATENT DOCUMENTS

| | | |
|---|---|---|
| JP | 2004-219181 | 8/2004 |
| JP | 2006-033650 | 2/2006 |
| JP | 2006/033650 | 2/2006 |
| JP | 2006/522492 | 9/2006 |
| JP | 2007/533142 A | 11/2007 |
| JP | 2008/527749 A | 7/2008 |
| WO | 2005/101511 A1 | 10/2005 |
| WO | 2006/078685 A2 | 7/2006 |
| WO | 2008/125915 | 10/2008 |

OTHER PUBLICATIONS

Techopedia.com, Printed Circuit Definition, https://www.techopedia.com/definition/2267/printed-circuit-board-pcb.*

Bing.com, Integrated Circuit definition, http://www.bing.com/search?q=define+integrated+circuits&src=IE-SEARCHBOX&FORM=IENTSR.*

International Search Report for PCT/GB2010/000011, mailed Apr. 18, 2011.

Notice of Reasons for Rejection dated Aug. 27, 2013, re JP 2011-544084 (including English translation).

Notice of Reasons for Rejection dated Feb. 5, 2013, re JP 2011-544084 (including English translation).

JP Office Action (and English translation) dated Mar. 10, 2015, in JP 2014-124901.

Decision of Rejection dated Feb. 18, 2014, from JPO re JP 2011-544084 (including English translation).

* cited by examiner

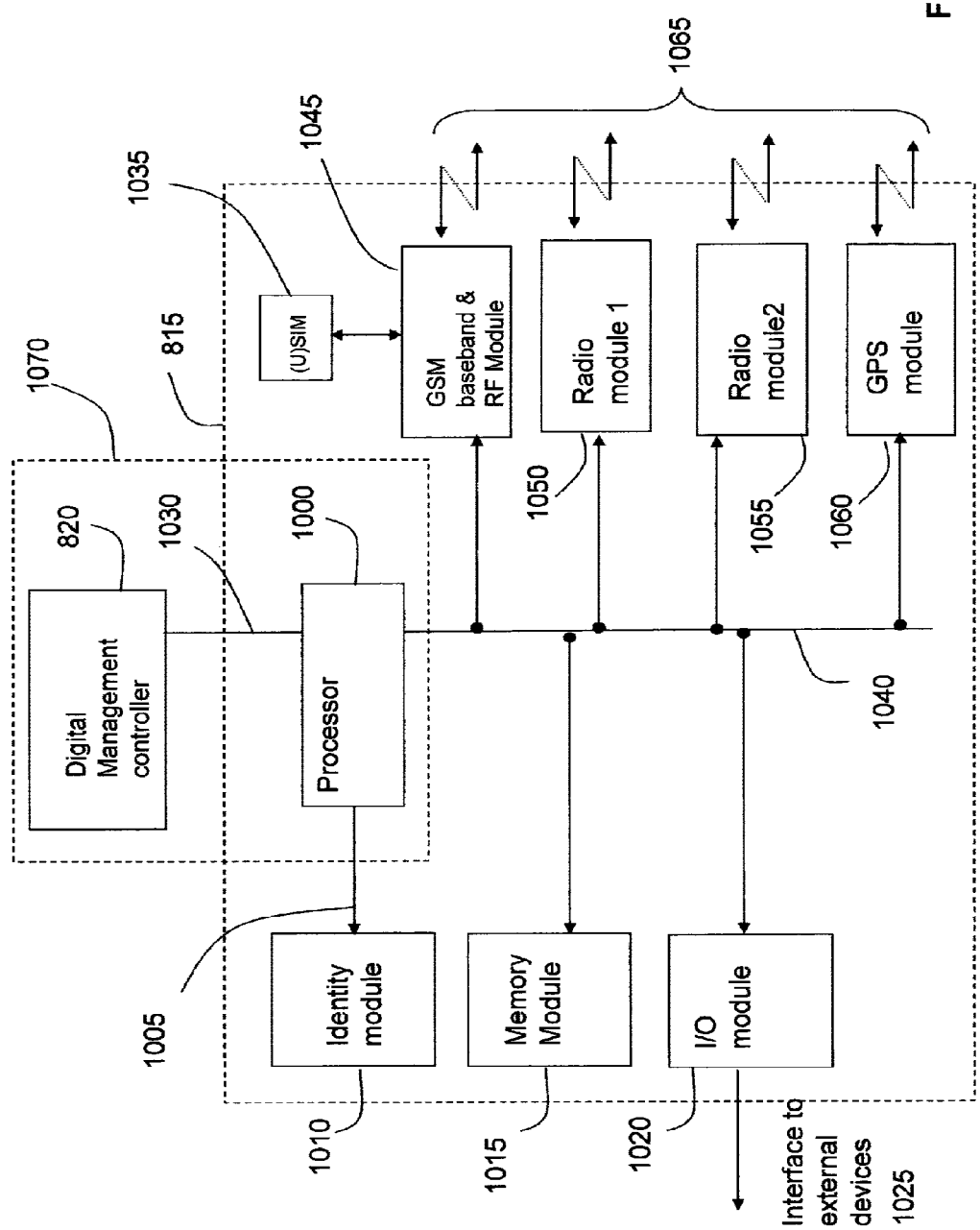

METHOD AND APPARATUS FOR SECURE ENERGY DELIVERY

This application is the U.S. national phase of International Application No. PCT/GB2010/000011, filed 6 Jan. 2010, which designated the U.S. and claims priority to GB Application No. 0900082.9, filed 6 Jan. 2009, the entire contents of each of which are hereby incorporated by reference.

1. TECHNICAL FIELD

The present invention relates to apparatus and a method for secure energy delivery. It finds particular application in the delivery of electrical energy by solar panels or arrays.

2. RELATED ART

Known photovoltaic (PV) solar arrays are often comparatively simple devices, particularly suited to produce electricity where simplicity and potential ruggedness is highly valued. They can be used in controlled environments, such as within the boundary of a property and often on a roof, or they can be used in much less secure locations such as by the roadside to power emergency telephone equipment.

They are often associated with a management unit known as a Maximum Peak Power Tracking (MPPT) controller which maximises power transfer between the solar panel and a battery or other energy storage device. Such a management unit would normally incorporate a microprocessor which also allows additional intelligence and communication functions to be associated with individual panels.

It is known to pass the electrical output of a solar panel through a metering device to a remote upstream server via a communications link and this can be done for various reasons: to measure and report the output; to gauge efficiency; or for maintenance purposes. U.S. Pat. No. 7,412,338 entitled "SOLAR POWERED RADIO FREQUENCY DEVICE WITHIN AN ENERGY SENSOR SYSTEM" describes such a system where a solar panel powers a module consisting of a microprocessor, memory, RF transceiver and antenna. There are risks associated with such an arrangement however, such as falsification of the measured output, for example where used to assess a contribution to a local or national power grid or to obtain carbon credits, or that the panel itself will be stolen.

A secure metering solution is described in U.S. Pat. No. 7,188,003 entitled "SYSTEM AND METHOD FOR SECURING ENERGY MANAGEMENT SYSTEMS". This describes a power management architecture with multiple secure intelligent electronic devices ("IEDs") distributed throughout a power distribution system to measure and manage the flow and consumption of power from the system. These communicate securely to upstream back-end servers, and secure metering solutions include encryption and authentication based on Public Key Encryption. Authentication prevents fraudulent substitution or spoofing of IEDs and includes parameters such as time/date stamps, digital certificates, physical locating algorithms including cellular triangulation, serial or tracking IDs, which could include geographic location and non-repudiation.

BRIEF SUMMARY

According to a first aspect of embodiments of the invention, there is provided a solar power conversion device for receiving solar radiation and converting it to an electrical output, the device having embedded therein:

i) an electrical output measuring arrangement for measuring the electrical output to provided metering data;

ii) an information processing device which provides a security module for associating security information with the metering data to create trusted metering data; and iii) a metering output for delivering the trusted metering data from the solar power conversion device.

Previously known arrangements are based on well-understood software applications for ensuring security. However, it has been said that a software system cannot 'validate itself'. In embodiments of the present invention, trusted hardware is embedded into a solar power conversion device, therefore being physically very close to the point of energy conversion and significantly improving integrity of the metering data.

Preferably, the metering output is adapted for connection to a communication link such as a network connection. The metering output may therefore provide a communications module for sending the metering data on the communication link.

Embodiments of the invention allow a solar power conversion device, for example a solar panel or array of solar cells, to be remotely monitored. Having an embedded output measuring arrangement makes it significantly more difficult to falsify metering data than where the electrical output of the device goes through a separate metering component and the inclusion of an embedded security module offers several further options, including for example the use of trusted digital certificates.

This trusted security hardware, the security module, could be based upon known tamper-resistant smart card cores which can be used for data storage, tamper detection and key pair husbandry as well as identification, authentication, and encryption of uplink data streams.

The solar power conversion device may also have embedded therein a management module connected to receive trusted metering data from at least one security module and to deliver data to the metering output. In such embodiments, the management module need not take part in the security aspects of the energy generation information which are provided by the security module.

A key benefit of embodiments of the invention is that unauthorised tampering with the secure hardware, the security module, or anything associated with it, can be arranged to trigger a permanent change in the behaviour of the panel and the attributes of information transmitted via the metering output.

Where the solar panel comprises an array of solar cells, an output measuring arrangement and security module might be embedded in at least one or more of the solar cells themselves, and preferably in each of them to provide maximum security.

Preferably, the device further comprises a receiver and the information processing device is arranged to respond to incoming communications such that the device can be managed remotely, either via the communication link or separately. The receiver might be provided for example in the communications module. The device can be arranged as part of an integrated communications network, for example connected to a remote management console, one or more other power-generating devices and/or to one or more power-consuming devices.

Embedded in this context is intended to mean carried in or on the same mechanical unit, for instance being structurally integrated with a solar cell, mounted on a solar panel and/or sealed within the same weatherproof containment as the solar power conversion device. More preferably, embedded is also used in an electrical sense that there are only permanent electrical connections between the device and the embedded components, these usually being direct. This might be achieved at least partially by printed circuit or hybrid circuit technology for example, or by semiconductor fabrication and/or assembly techniques such as epitaxy and flip chip mounting, during the original production of the solar power conversion device. The use of integrated semiconductor technology can offer a very high level of integration which has significant advantages in terms of reliability and ease of use in the field.

Preferably, the security module comprises a type of trusted module which can generate trusted digital certificates in relation to the metering data and could then support secure processes such as the automatic awarding of 'carbon credits' in accordance with how much renewable electricity has been generated.

For communications purposes, the information processing device might be configured as a 'thin client', linked to a server over a secure network by suitable telecommunications techniques. There may be many solar power conversion devices linked to the same server over the same network or connected networks, offering a new family of solar panels which could be supported over a communications infrastructure offering services such as centrally managed solar-powered lighting or local public or private communications facilities.

According to a second aspect of embodiments of the invention, there is provided a power conversion device for converting power to an electrical output, the device comprising a substrate carrying integrated circuit components, the components comprising:

i) an electrical output measuring arrangement for measuring the electrical output to provide metering data;

ii) an information processing device which provides a security module for associating security information with the metering data to create trusted metering data; and iii) a metering output for delivering the trusted metering data from the power conversion device.

In embodiments of the invention according to its second aspect, the same principle is applied as in embodiments of the invention in its first aspect, which is the structurally integral security module, in this case provided in integrated circuitry.

It is to be understood that any feature described in relation to any one embodiment or aspect of the invention may be used alone, or in combination with other features described, and may also be used in combination with one or more features of any other of the embodiments or aspects, or any combination of any other of the embodiments or aspects, if appropriate.

BRIEF DESCRIPTION OF THE DRAWINGS

A secure solar panel will now be described as an embodiment of the invention, by way of example only, with reference to the accompanying figures in which:

FIG. 10 shows a secure communications module for use with the embedded panel management module of FIG. 4;

DETAILED DESCRIPTION OF EXEMPLARY EMBODIMENTS

Figure 1:
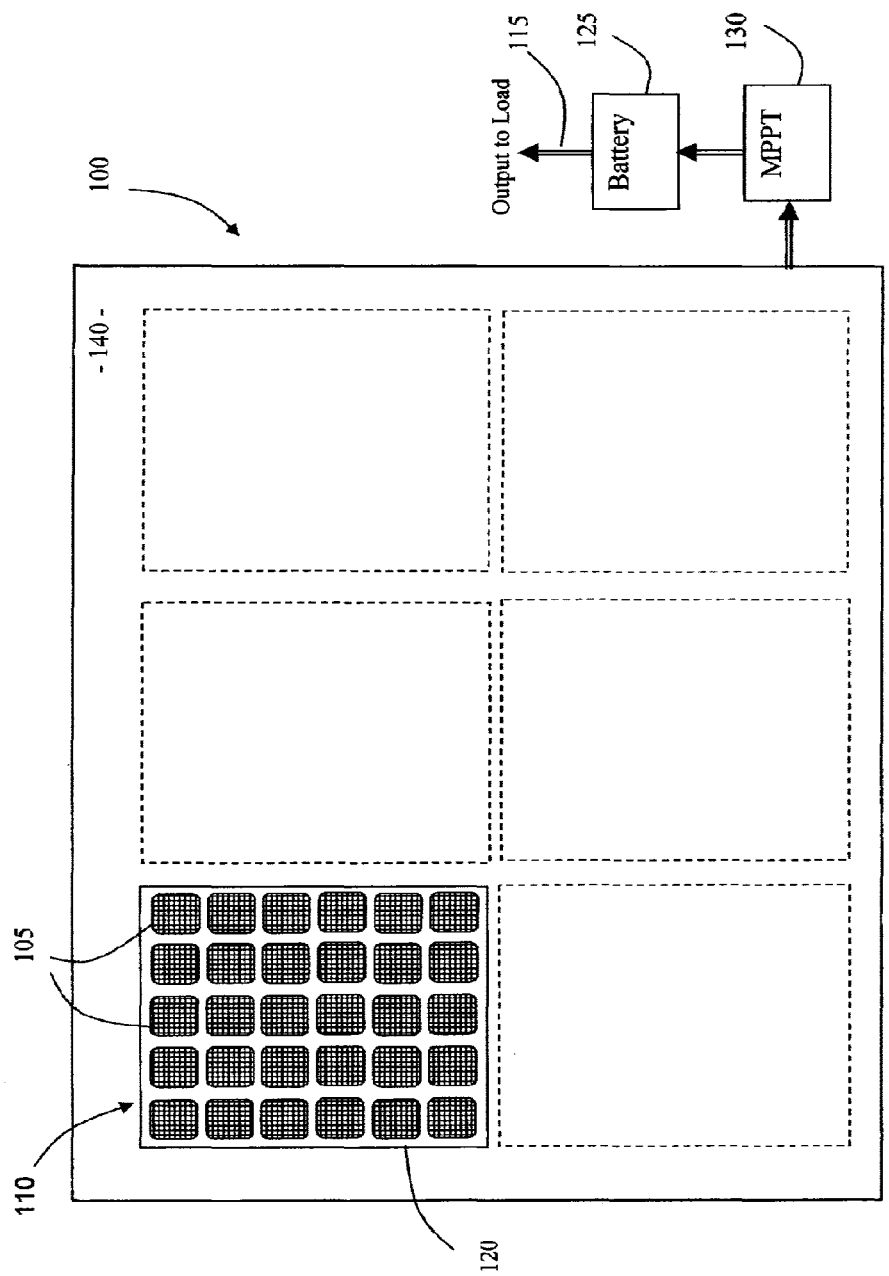
FIG. 1 shows in diagrammatic plan view a solar panel of known type, together with a functional block diagram of components for delivering power from the panel.

Referring to FIG. 1, a secure solar panel 100 according to an embodiment of the invention comprises arrays of PV cells 105 of known type, arranged in modules 110 on the panel 100.

Each PV module 110 is made up of a number of PV cells 105 attached to a backplane 120 and, to generate a useful voltage and current in known manner, the cells 105 are connected in a series-parallel configuration. The PV modules 110 are connected in a series-parallel configuration on a support panel 140 or backing material and linked together by flat wires or metal ribbons (not shown) for connection to an external load, to provide the solar panel 100. Often this is in conjunction with a battery 125, in which case a unit such as a Maximum Peak Power Tracking (MPPT) controller 130 is used to maximise power transfer between the solar panel 100 and the battery 125. The battery 125 is then connected to the load via a power output link 115. The solar panel 100 in this known type of assembly can be encapsulated in a clear polymer or glass to provide a weatherproof containment. If encapsulated in polymer, it may be protected at least over the area of the cells 105 with a sheet of tempered glass to form a weatherproof sealed unit.

A suitable MPPT controller 130 for use as above is described for example in "Solar Panel Peak Power Tracking System", by Anderson, Dohan & Sikora, published by Worcester Polytechnic Institute MA 01609, United States, as Project Number: MQP-SJB-1A03 in March 2003.

Figure 2:
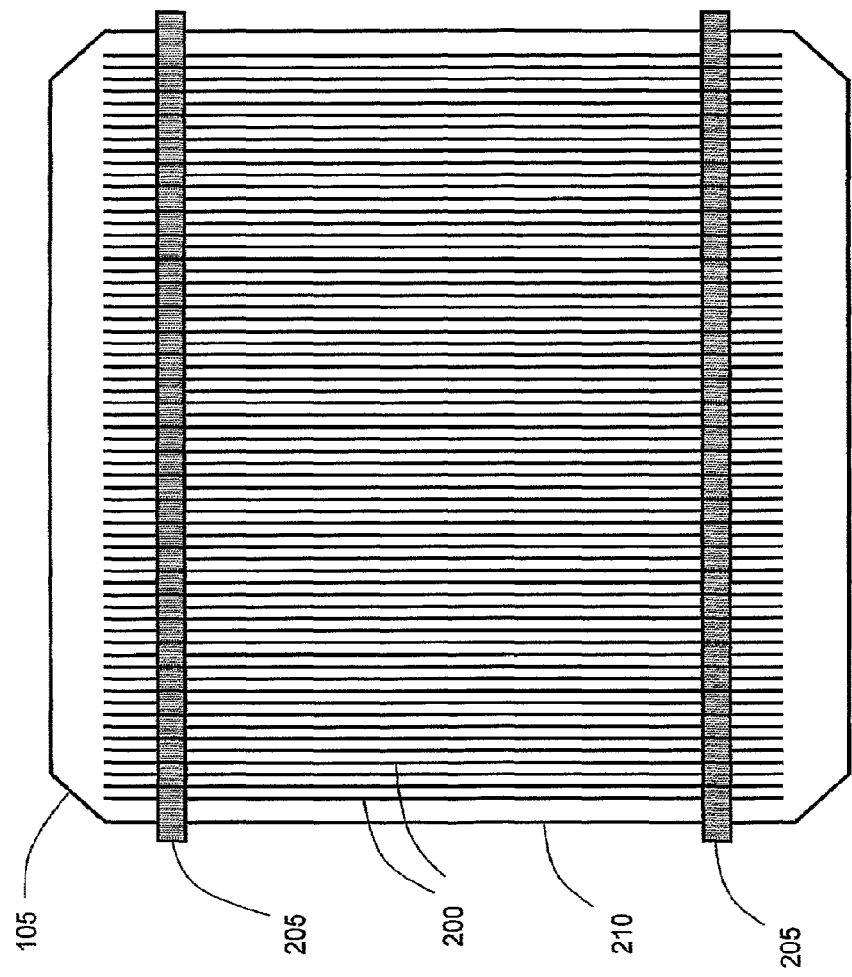
FIG. 2 shows in diagrammatic plan view a single PV cell of the solar panel of FIG. 1.

Referring to FIG. 2, solar cell development has currently reached what is called the third generation but the principle of operation has not changed since the first generation. A typical first-generation PV cell 105 is generally embodied as a plurality of large-area, high quality p-n junction devices, or diodes, created in bulk single-crystal silicon wafers 210. Electrical power is picked up by ohmic metal-semiconductor contacts which are connected to each of the n-type and p-type sides of the junction devices, on either side of the wafers. To provide one of the contacts, each PV cell 105 carries on one main surface a thin metal grid of fingers 200 and inter-cell bus bars 205. To provide the other of the contacts, each PV cell 105 on its other main surface carries a metallic electrode contact (not shown) which often covers the entire surface and can also be used to mount the wafer 210. Each PV cell 105 can be approximately modelled in electrical terms as a current source in parallel with a diode. Second generation PV cells are generally thin film devices deposited onto backing materials such as glass or ceramics and third generation PV cells are aimed at improving electrical efficiency without unduly increasing costs. These second and third generation cells tend to be less expensive to make because they involve cheaper materials or smaller amounts of expensive materials.

Figure 3:
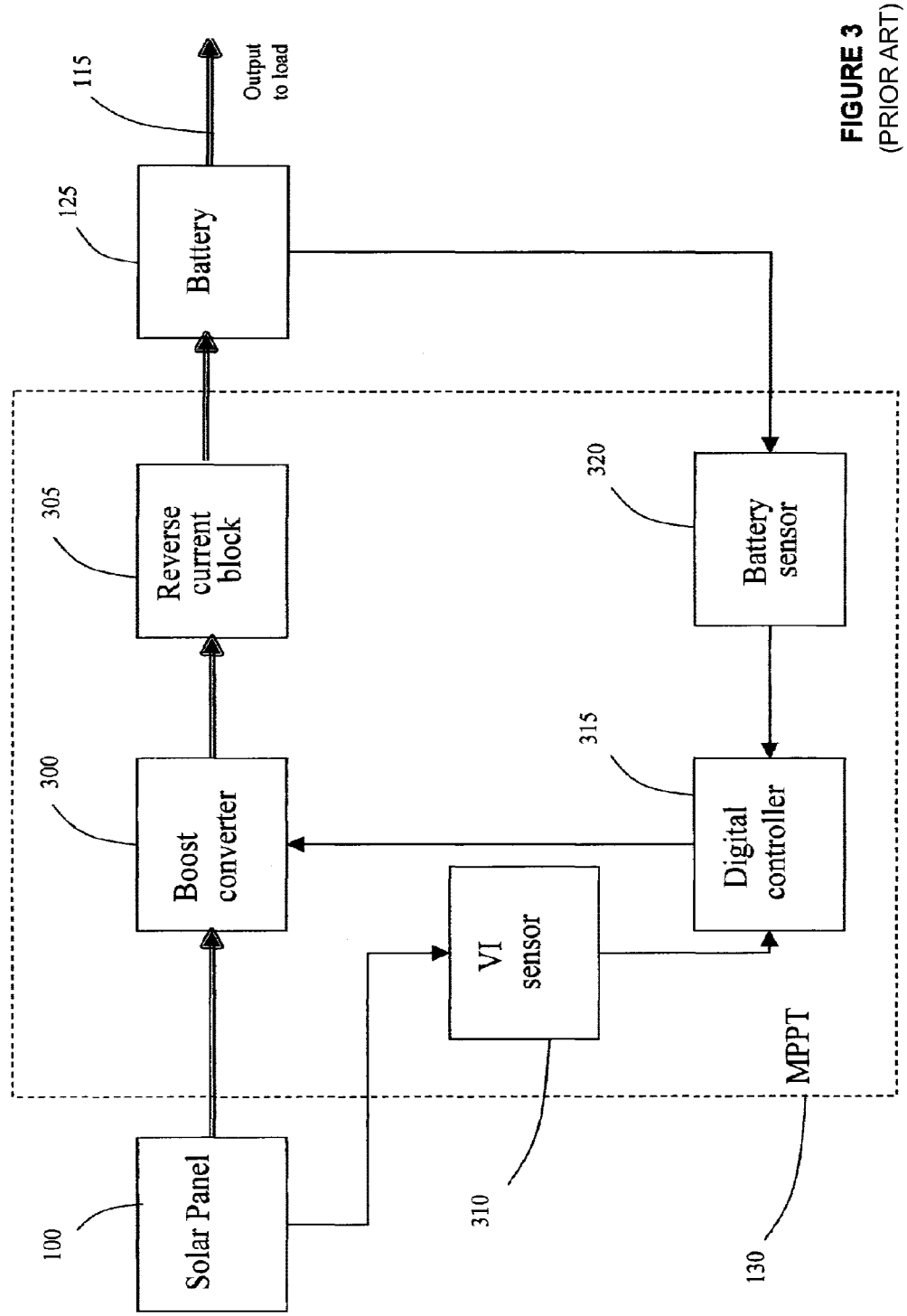
FIG. 3 shows a functional block diagram of an arrangement of the solar panel of FIG. 1 for charging a battery.

Referring to FIG. 3, in an arrangement for a solar panel 100 to charge a battery 125, the MPPT controller 130 consists of a closed-loop switching type power control system. This has a digital controller 315 which acts on monitoring data to optimise the solar panel output in known fashion, by use of a boost converter 300. For example, a voltage/current ("VI") monitor 310 monitors the solar panel voltage and current continuously, allowing maximum power to be extracted under different conditions of sunlight. A battery sensor 320 also monitors the state of charge of the battery 125 so that it is not overcharged. The VI monitor 310 and the battery sensor 320 deliver their data to the digital controller 315 which uses it in sending instructions to the boost converter 300. Reverse current in the event that the voltage of the battery 125 exceeds the output voltage of the solar panel 100 is blocked by a reverse current block 305.

Figure 4:
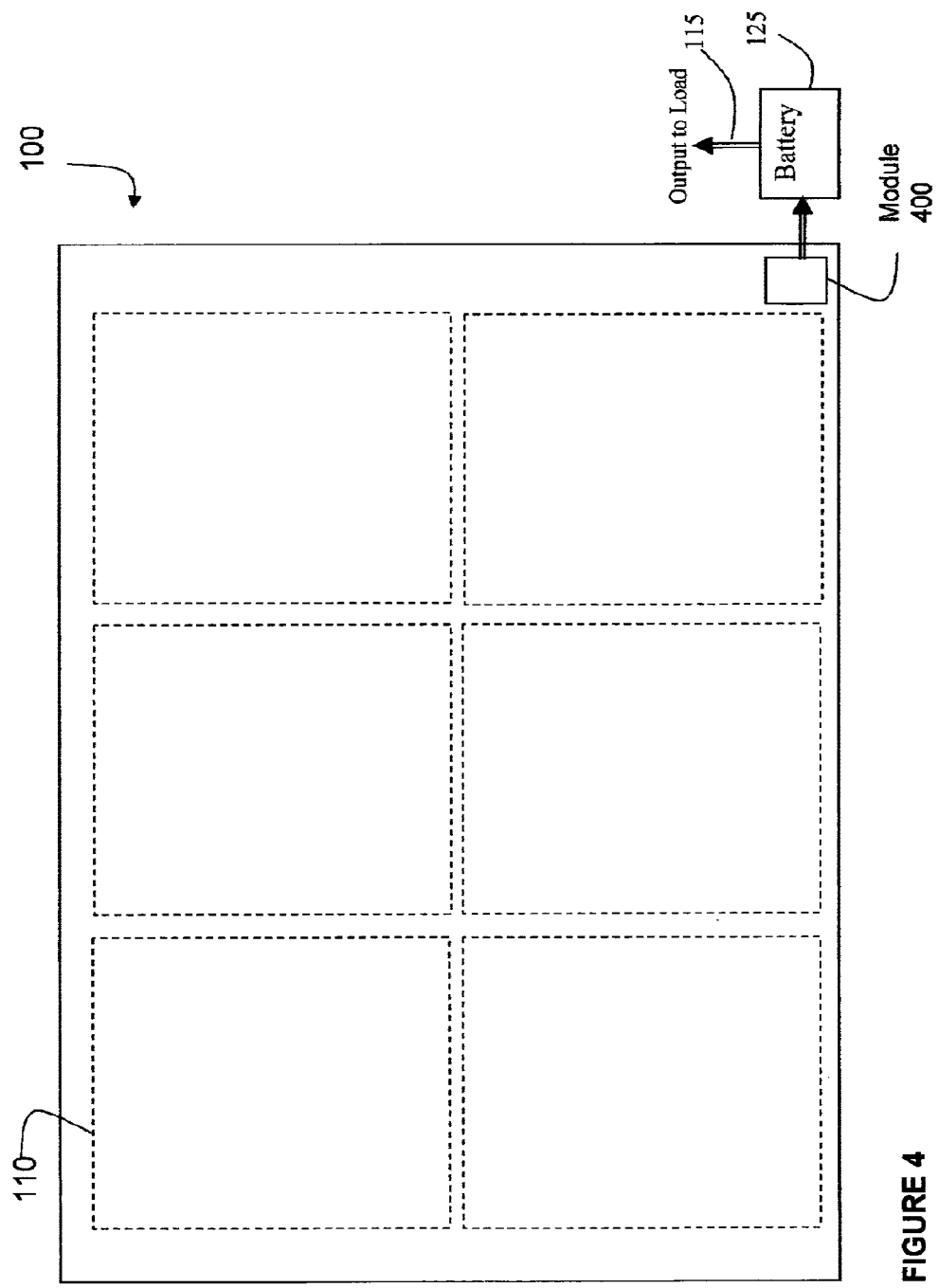
FIG. 4 shows in diagrammatic plan view a solar panel according to an embodiment of the invention, with an embedded panel management module.
Figure 5:
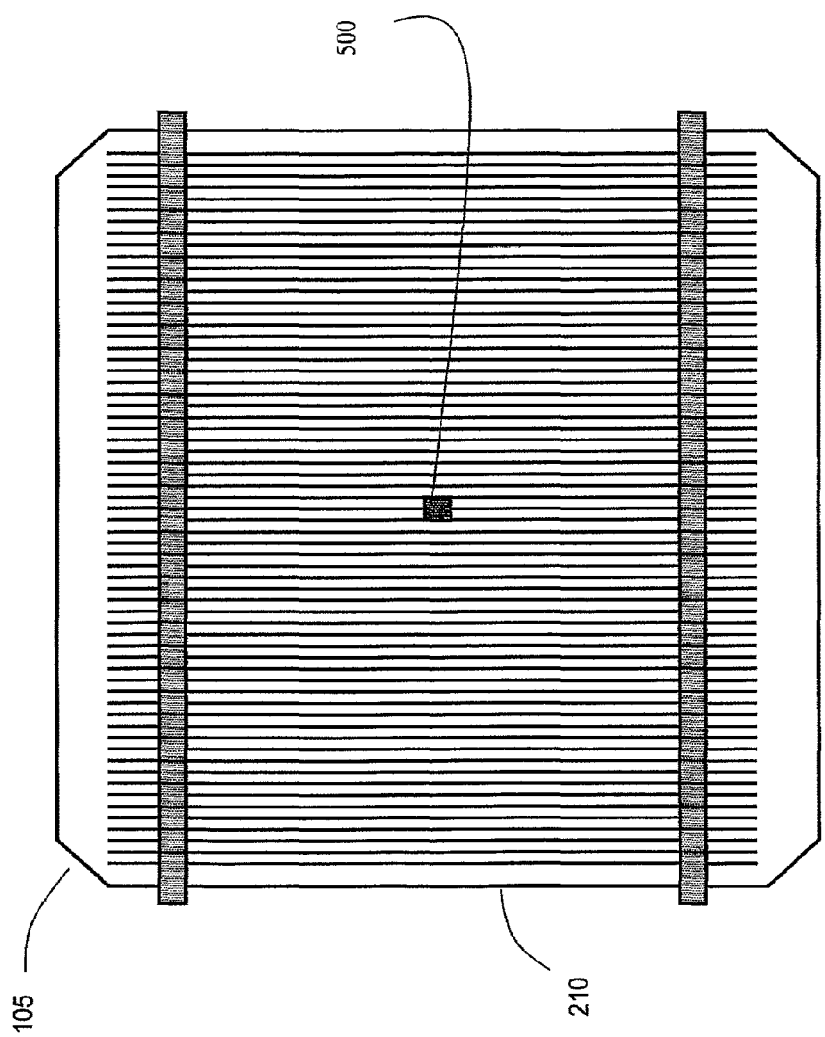
FIG. 5 shows in diagrammatic plan view a PV cell according to an embodiment of the invention with an embedded power reporting module based on a trusted computing platform and providing an information processing device and security module.

Referring to FIGS. 4 and 5, in a secure solar panel 100 according to an embodiment of the invention, functionality can be added to the solar panel 100 and/or to at least one, or preferably each, of a number of solar cells 105 making up the panel 100. For example, a panel management module 400 can be embedded in the solar panel 100, which module 400 encompasses at least some functions of the MPPT controller 130. Alternatively, at least some functions, such as the VI monitor 310, can be embedded in a power reporting module 500 in the respective solar cells 105.

Importantly, secure data functionality can be embedded in the panel management module 400 and the power reporting module 500 so that data delivered from a solar panel 100 can be trusted and identifiable. The structure of the solar cells 105 and/or the solar panel 100 can be exploited in this respect. Either or both of the panel management module 400 and the power reporting module 500 can thus provide a security module for associating security information with data to create trusted data.

In the embodiment described below, a VI monitor 310 is provided in a power reporting module 500 embedded in each of the solar cells 105 for measuring and reporting in secure manner, via an internal bi-directional data bus, the power generated by its respective cell 105. This provides metering data with respect to the solar cells 105. The internal bi-directional data bus is connected to a panel management module 400 embedded in the solar panel 100, where the metering data can be stored, collated, and/or onwardly reported.

FIG. 4 shows the secure solar panel 100 with a panel management module 400 located at a suitable position to be sealed and encapsulated when the panel 100 is assembled. FIG. 5 shows a solar cell 105 of the solar panel 100 having an embedded power reporting module 500. A power reporting module 500 and the panel management module 400 are described in more detail below, with particular reference to FIGS. 7 and 8.

The solar panel 100 carrying the panel management module 400 is referred to below as an "intelligent solar panel" 100. It is envisaged that each solar panel 100 will always contain a panel management module 400. However there may be advantages in sharing one module 400 between several panels 100, or equally having several panels 100 containing respective modules 400 operating on a peer-to-peer basis via a built-in secure communications capability.

Figure 6:
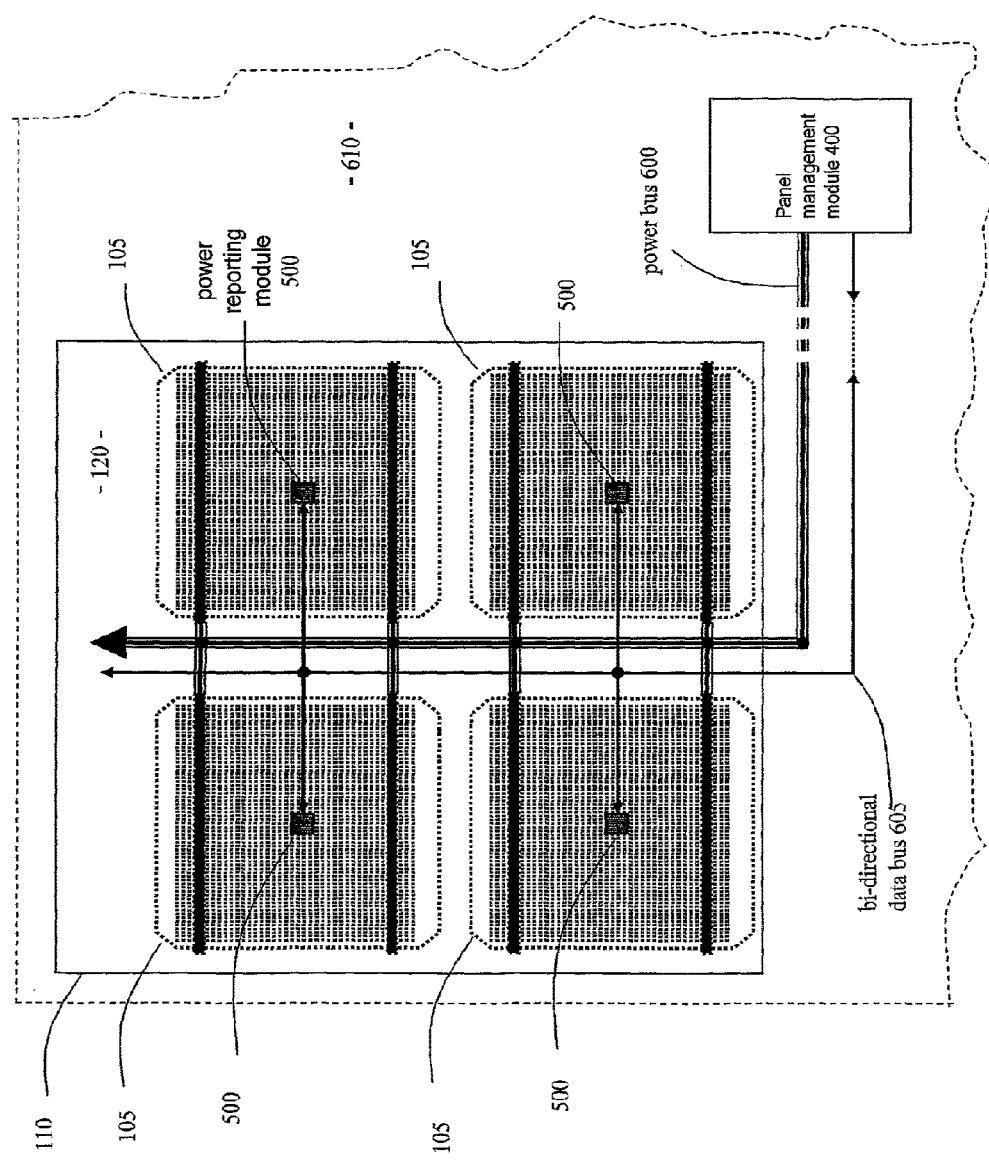
FIG. 6 shows a functional block diagram of an arrangement of individual PV cells of the solar panel of FIG. 1 to deliver power and data to an embedded panel management module as shown in FIG. 4.

Referring to FIG. 6, the solar cells 105 in the PV module 110 each deliver their power onto a power bus 600, the bus being connected in a suitable manner to the panel management module 400. At the same time, each power reporting module 500 reports the power output of its cell 105 as metering data via a bi-directional data bus 605 to the panel management module 400, using a suitable data protocol. In a feedback loop, the outputs of the individual cells 105 can each be controlled by the panel management module 400 which communicates with the power reporting modules 500 via the bi-directional data bus 605. This exploits functionality that might previously have been associated with the MPPT controller 130. Thus the power reporting modules 500 not only report the power output of their cells 105 but can also modify the power outputs of the cells 105 in response to commands from the management module 400.

The PV module 110 is encapsulated in a containment material 610 (shown in dotted outline in FIG. 6) which seals and protects the solar panel 100 as a whole, prior to installation. The containment material 610 thus encapsulates the solar cells 105 and the power reporting modules 500 and the management module 400 are embedded therewith in a single physical unit. As shown in FIG. 6, the full extent of the solar panel 100 is not shown, there potentially being additional PV modules 110 mounted on a support panel 140 (not shown explicitly in FIG. 4) and connected to the management module 400. The containment material 610 may comprise a known material for use in protecting solar panels, such as a clear polymer which will transmit solar radiation to the cells 105 and also allow an air interface to mobile communications technology associated with the management module 400 and further described below.

Each power reporting module 500 might itself be powered by its respective solar cell 105 but another arrangement might power the reporting module 500 from the panel management module 400, for example using the power bus 600 or a DC component on the bi-directional data bus 605.

The reporting module 500 can be constructed using tamper-resistant and/or tamper-evident technology such as that used in integrated circuit cards, described below with reference to FIG. 9. In addition to measuring and reporting the power output of its cell 105, this technology allows module 500 to hold secure data containing identity codes ("IDs") and the capability to provide digitally signed responses in relation to the modules.

Figure 7:
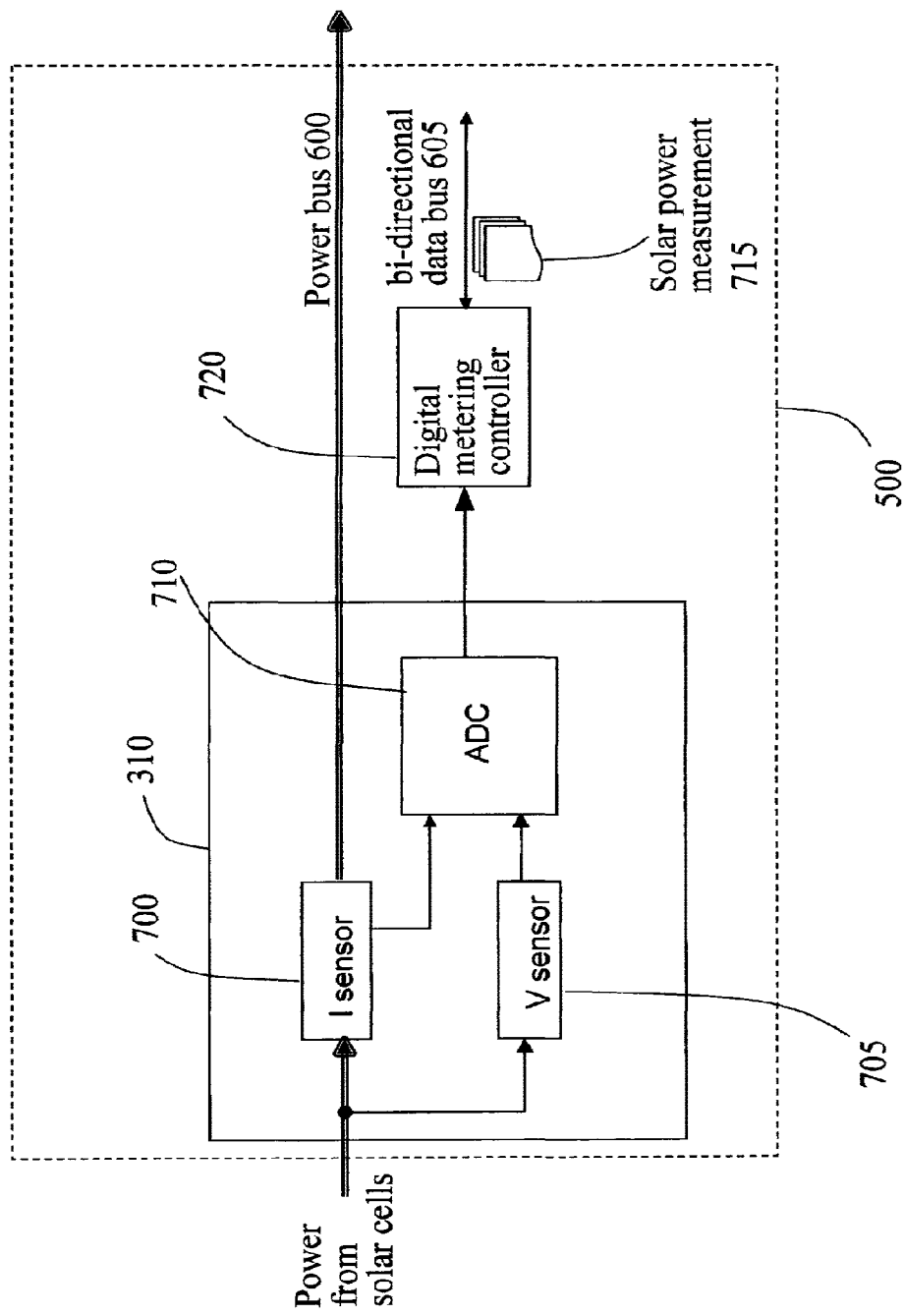
FIG. 7 shows a functional block diagram of the embedded power reporting module shown in FIG. 5.

Referring to FIG. 7, the power reporting module 500 in an embodiment of the invention has two primary sub-modules, these being the VI monitor 310 and a digital metering controller 720 which provides some of the functionality offered by the digital controller 315 previously provided as part of the MPPT controller 130. The VI monitor 310, in more detail, comprises a current sensor 700, a voltage sensor 705 and an analogue to digital converter ("ADC") 710 which has a coding capability. The ADC 710 will be chosen or configured to give a power measurement output 715 in a suitable format for the digital metering controller 720.

Suitable lossless measurement circuits that could be used as the current sensor 700 are known and described for example by Rincon-Mora, Gabriel and Zadeh, Hassan in "Current Sensing Techniques for DC-DC Converters." which appeared in the 45th Midwest Symposium on Circuits and Systems, 2002, published 4-7 Aug. 2002, Volume 2, on pages II-577-II-580. Suitable voltage sensing circuits for use as the voltage sensor 705 are also known and well understood.

Figure 8:
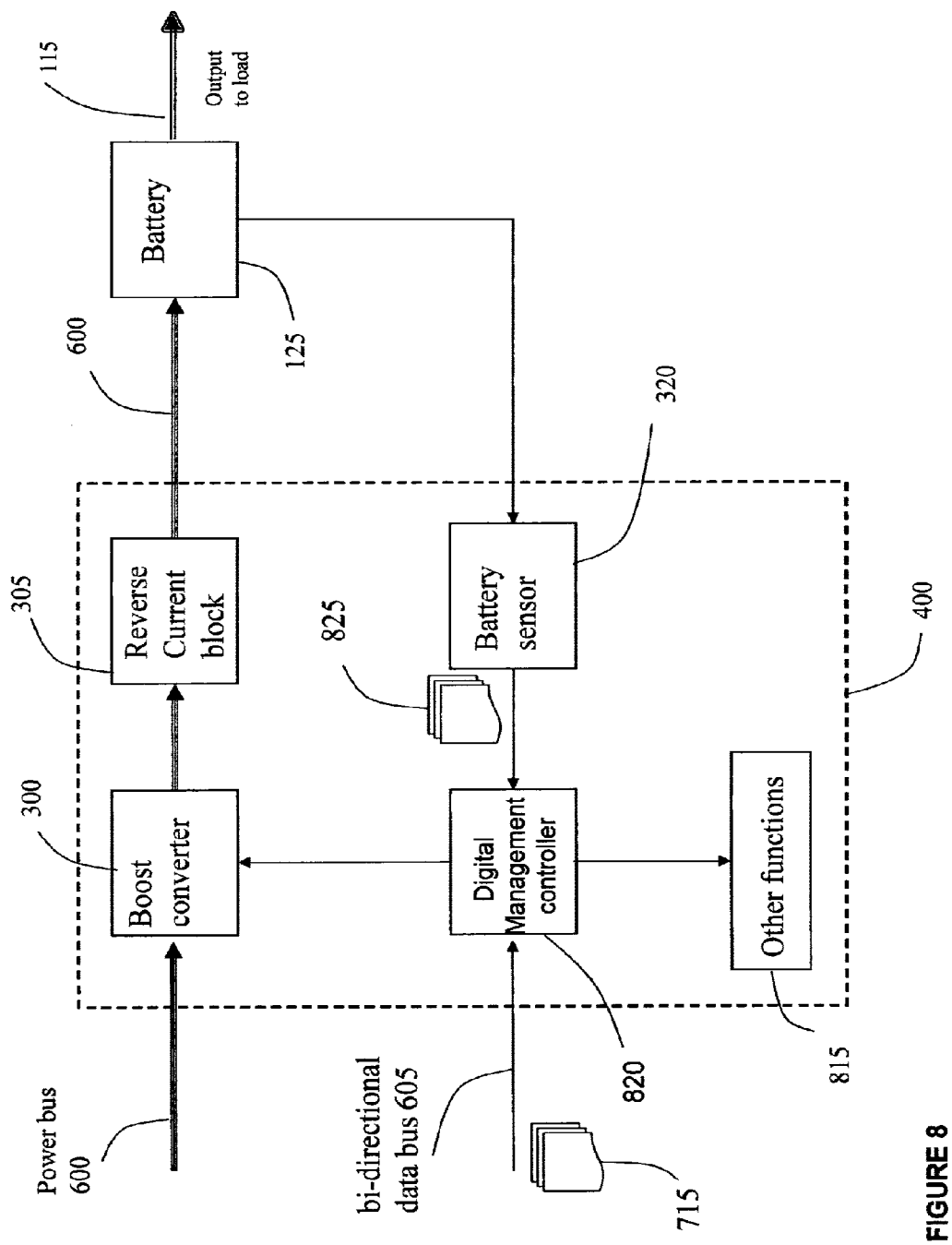
FIG. 8 shows a functional block diagram of the panel management module of FIG. 4.

Referring to FIG. 8, outputs from the power reporting module 500 (not shown in FIG. 8) to the panel management module 400 are:

- the electrical power generated by the associated solar cell 105 via the power bus 600 shown in FIG. 6
- a digital, coded power measurement reading (also referred to herein as metering data) via the bi-directional data bus 605
- secure data which includes the unique identity code ("ID") and predetermined digitally signed response of the associated solar cell 105 via the bi-directional data bus 605

The power reporting module 500 thus provides a security module for associating security information with metering data to create trusted metering data 715, and a metering output with respect to its associated solar cell 105 for sending the trusted metering data to the panel management module 400 via the bi-directional data bus 605. The trusted metering data 715 is a combination of the digital, coded power measurement reading with the secure data mentioned above.

The panel management module 400 provides further functions previously provided by the MPPT controller 130. For example, it provides a boost converter 300, a reverse current block 305, a battery sensor 320 and a digital management controller 820. The boost converter 300, reverse current block 305 and the battery sensor 320 all provide their known functions with respect to a MPPT controller 130. The digital management controller 820 provides the functions of the digital controller 315 of the MPPT controller 130 which are missing from the digital metering controller 720 of the power reporting module 500. That is, it receives power measurement data 715 from the VI sensor 310 and battery monitoring data 825 from the battery sensor 320 and uses it in controlling power delivery to the battery 125 via the boost converter 300. The battery sensor 320 will generally provide current data about the state of the battery 125, preferably associated with a battery ID so that data can be collated for a specific battery 125 over its lifetime.

Importantly however, the digital management controller 820 of the panel management module 400 can also initiate additional functions 815 such as sending the power measurement and battery monitoring data 715, 825 outwards from the solar panel 100 in a secure manner, using for example a communications network that may be based on mobile telephone technology. That is, it also provides a metering output for trusted metering data 715, in this case from the solar panel 100 as a whole and can potentially add a second level of security based on mobile telephone technology.

The additional functions 815 are those typical of a device used in a mobile phone or a personal digital assistant ("PDA"), though it would be possible to base them on the capabilities of a high-end personal computer. This has the advantage of using tried and tested software routines developed with industry standard software and operating systems which can be configured to provide both solar panel management capability and auxiliary functions. The additional functions 815 are further described below with reference to FIG. 10.

The function of the battery sensor 320 may be extended to monitor the power supplied to the load via the power output link 115 as well as to the panel management module 400 and the additional functions 815 in light of their power requirements. This data might be used by the digital management controller 820 to provide battery backup to support operation when the solar panel 100 does not generate sufficient power. Data 825 coming from the battery sensor 320 may also include any unique information held in the battery 125. Such information might include a serial number but could equally encompass a wide range of indicators associated with the health or status of the battery 125. Additionally, the digital management controller 820 may process information transmitted in the power measurement data 715 in conjunction with information transmitted in the battery monitoring data 825 to assess the health of individual solar cells 105, or other factors that can be derived from this information. The digital management controller 820 may then communicate control signals back to the power reporting module 500 to compensate for changes in performance of the cells 105, for example through ageing effects.

Figure 9:
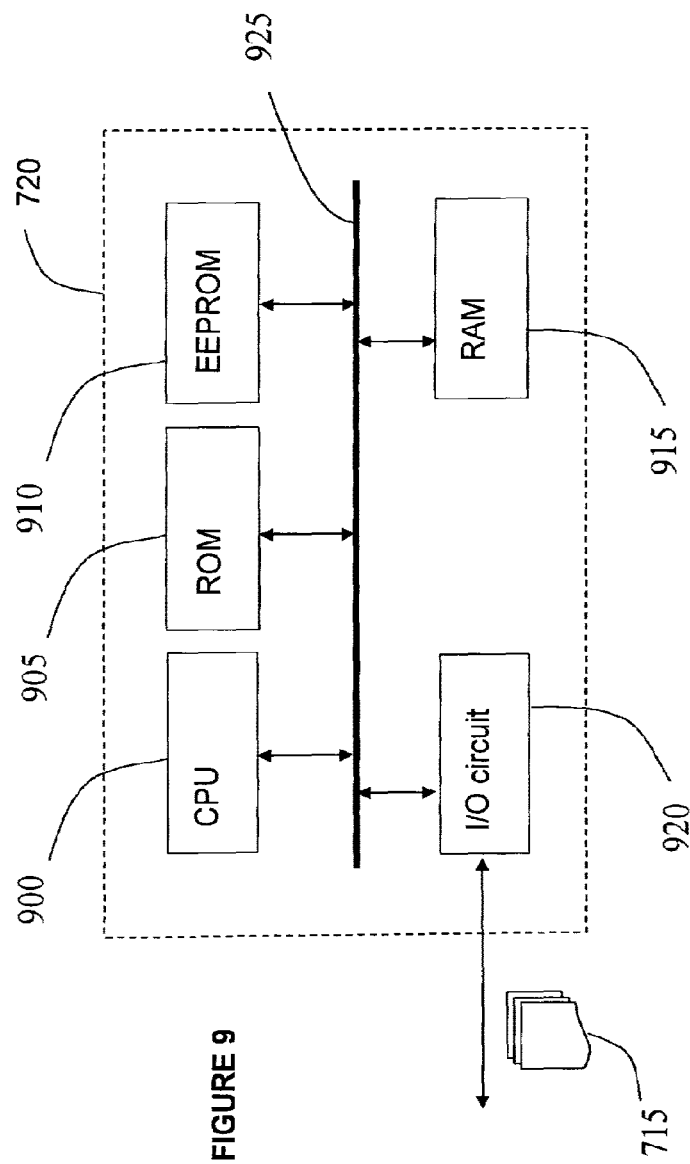
FIG. 9 shows a functional block diagram of a known form of circuit technology to support an optional form of the embedded power reporting module of FIG. 5.

Referring to FIG. 9, a technology that lends itself to provision of the digital metering controller 720, in the power reporting module 500 is that of the chip used in integrated circuit cards ("ICC"s). The Universal Integrated Circuit Card ("UICC") smart card chip used in GSM ("Global System for Mobile") and UMTS ("Universal Mobile Telecommunications System") mobile networks is a particular example. Such a chip can receive input data, process it and deliver it as output data, and supports data processing functions such as encryption as well as securely holding typically a few hundred kilobytes of data.

A suitable ICC operating system (OS) might be either 'native', or 'Java Card' which is based on a subset of the Java programming language specifically targeted at embedded devices. (Java is a programming language originally released in 1995 as a core component of Sun Microsystems' Java platform.) The advantage of a native OS is that the code can be specifically optimised for a particular application such as described here, though the Java Card OS may equally be applicable.

Importantly, ICCs can contain a security system with tamper-resistant and/or tamper-evident properties such as a secure cryptoprocessor, secure file system and identity features and can provide security services such as confidentiality of information in the memory. Data can be transferred to a central administration system using a card reading device, and one of the advantages of including a device typical of that used in a mobile phone for the digital management controller 820 of the panel management module 400 is that the data transfer standards between it and the power reporting module 500 are well understood.

The internal structure of an ICC is based around an internal bus 925 to which is connected a central processing unit ("CPU") 900, a read only memory ("ROM") 905, an electrically erasable, programmable, read only memory ("EEPROM") 910, a random access memory ("RAM") 915 and an input/output (I/O) circuit 920. The ROM 905 stores programs for executing various card functions. The EEPROM 910 contains individual card user information. The RAM 915 temporarily stores data required for data processing and the I/O circuit 920 supports communications with external equipment.

An ICC will also usually have power and ground connections, a reset terminal for initialising the CPU 900 and a clock terminal for receiving an external clock signal.

It is an option that the internal bus 925 of the ICC is connected directly to the bi-directional data bus 605 between the power reporting modules 500 of the solar cells 105 and the panel management module 400 of the solar panel 100.

This bi-directional data bus 605 might for example use a simple data transmission protocol such as that defined in ISO/IEC 7816-3. However, data is alternatively input via the I/O circuit 920 and will be transmitted within the ICC on the internal bus 925 using known ICC protocols.

Referring to FIG. 10, the additional functions 815 that can be initiated by the digital management controller 820 of the panel management module 400 are generally organised by a processor 1000. The digital management controller 820 may have sufficient processing power to fulfil the functions of the processor 1000 as well as those previously described, in which case the two can be supported by a single device 1070 which typically might employ a RISC (reduced instruction set computer) architecture. The processor 1000 has a bi-directional data bus 1030 connecting it to the digital management controller 820 and an internal data bus 1040 connecting it to an air interface 1065. The air interface 1065 allows the panel management module 400 to be managed remotely.

The additional functions 815 primarily have the purpose of supporting trusted communication to and from the solar panel 100, for the purpose of secure management and reporting. Units supporting the additional functions 815 are:

an identity module 1010
a memory module 1015
an input/output ("I/O") module 1020
the air interface 1065, including a Global Positioning System ("GPS") transceiver 1060
Universal Subscriber Identity Module ("USIM") 1035

The identity module 1010 is a tamper-resistant and/or tamper-evident silicon chip which includes a unique identifier and a secret key to provide a trusted root for any required intelligent functionality for the processor 1000. In order for the identity module 1010 to provide this functionality it must be either fully integrated with the processor 1000 or, if physically implemented as a separate chip, the connection between the processor 1000 and the identity module 1010 should be by a dedicated, secure data bus 1005. This allows a solar panel 100 to support functionality recommended by bodies such as the Trusted Computing Group ("TCG").

The panel management module 400 thus also can be viewed as a security module for associating security information with data to create trusted data.

In a variation, the identity provided by the identity module 1010 can be derived from a collection of identities of power reporting modules 500 of the solar cells 105 through appropriate conversion, such as a one-way hash function SHA-1.

It might be noted in the above and elsewhere in this description that where a USIM is referred to, it may well be the case that an equivalent identity module might be used, and in particular a SIM ("Subscriber Identity Module").

Suitable examples of arrangements for providing an identity module 1010 include a "Trusted Platform Module" (TPM) in accordance with recommendations of The Trusted Computing Group ("TCG"), an Intel "Identity-Capable Platform" (ICP) or the ARM version TrustZone. These allow high-value trusted services to be provided by the processor 1000 and include secure access to any device, network or service, through a secure hardware execution zone. They can operate in conjunction with the secure power reporting modules 500 embedded in each solar cell 105. For example, the identity module 1010 can support downloadable USIM-style 'soft' credentials for delivery to the digital metering controller 720 of a secure power reporting module 500, or indeed to the digital management controller 820 of a panel management module 400, of a solar panel 100 for additional secure functions.

Regarding the Bodies and Technologies Mentioned Above:

The Trusted Computing Group ("TCG"), develop, define, and promote open standards for hardware-enabled trusted computing and security technologies, including hardware building blocks and software interfaces, across multiple platforms, peripherals, and devices;

Intel's Identity-Capable Platform (ICP) technology is a client-based approach to enabling flexible access to any device, network or service through a trusted environment. The technology is designed to work with mobile telephones, laptop computers, personal digital assistants and other personal and business devices, enabling identities to be shared, transported and locally managed; and ARM TrustZone is a safe execution environment that enables semiconductor and original equipment developers to incorporate their own application-specific security measures in tandem with their own hardware and software IP. Trust-Zone software components provide a secure execution environment and basic security services such as cryptography, safe storage and integrity checking to provide a platform for addressing security issues at the application and user levels.

The identity module 1010 may in practice be fully integrated into the structure of the processor 1000. This would have no impact on the functionality or purpose but might obviate the need for the dedicated, secure data bus 1005.

The memory module 1015 provides the ability to attach external, removable flash memory such as an SD (secure digital) card. This allows the solar panel 100 to securely store locally gathered or downloaded data in addition to any hard-wired memory provided by the processor 1000. The SD card flash memory is of sufficient size for locally gathered data to include video or other digitally encoded images. The identity module 1010 would allow this information to be encrypted.

The I/O module 1020 supports suitable standard bidirectional interfaces 1025 to allow external devices to be connected to the solar panel 100. This allows wired connections such as those based on USB ("Universal Serial Bus"), Ethernet, and ADSL ("Asymmetric Digital Subscriber Line") broadband technologies to be added to the panel 100 so the processor 1000 can communicate with other hardware or networks connected to it.

The air interface 1065 comprises a set of modules as follows:

a GSM baseband and radio frequency ("RF") module 1045
two radio modules 1050, 1055
a global positioning satellite ("GPS") radio transceiver 1060

These modules can operate independently and receive power from the battery 125 when the solar panel 100 is not generating electricity.

The GSM baseband and RF module 1045 also interfaces to a USIM card 1035 so that if desired a GSM/3G ("3$^{rd}$ Generation") mobile subscription can be incorporated into the intelligent solar panel functionality. As well as managing GSM/3G mobile subscriptions, if desired, the GSM module 1045 could support a SATSA for J2ME, Java Specification Request (JSR) 177. This would permit high speed communication between the USIM card 1035 and the processor 1000 to allow cryptographic security features running on the card 1035 to be accessed by the software routines running on the processor 1000.

The "SATSA for J2ME (JSR 177)" is a Java-based specification for an application programming interface ("API") defining a "Security and Trust Services API" for Java Platform, Micro Edition ("Java ME") devices. The SATSA extends the security features for the Java ME, previously known as the J2ME, platform through the addition of cryptographic APIs, digital signature service, and user credential management.

The two radio modules 1050, 1055 provide suitable interfaces to standard WiFi, WiMAX or any other emerging wireless standard circuits. These modules include high-power output transistors and can include planar antenna structures so that the solar panel 100 can form part of a communications system. Suitable antenna structures are disclosed for example in the paper "Investigation of planar antennas with photovoltaic solar cells for mobile communications" by Henze, N.; Weitz, M.; Hofmann, P.; Bendel, C.; Kirchhof, J.; Fruchting, H., published in Volume 1 of the proceedings of the 15th IEEE International Symposium entitled "Personal, Indoor and Mobile Radio Communications" held in 2004, 5-8 September, at pages 622-626.

The GPS module 1060 allows location information to be embedded in encrypted data transmitted by the GSM and radio modules 1045, 1050 and 1055 or the I/O module 1020. Other location-sensitive arrangements could be used but GPS technology is already well-established and subject to standards.

A significant advantage of the security architecture developed through the combination of the power reporting modules 500, the digital management controller 820 and/or the additional functions 815 is that the same principles can be extended to a wide variety of different kinds of transducers that might be attached to the solar panel 100 via wired or wireless connections. That is, the solar panel 100 may have attached thereto a transducer for generating data in relation to a measurable external variable for onward transmission as trusted measured data by use of one or both of the security module and the management module. This will allow the processor 1000 to measure for example various wavelengths of solar radiation and detect other kinds of ionising and non-ionising radiation, vibration, sound or in fact anything which might support secure external data gathering powered by an intelligent photo-voltaic array.

One of the benefits of embedding standardised ICC circuit architectures into each PV cell 105 to provide the power reporting module 500 is that it can be personalised with a unique identity and the data output encrypted with a secret key. This creates a trusted platform integrated into each PV cell 105 which can be configured to generate trusted energy certificates in relation to the amount of power the cell has generated. These will be gathered by the panel management module 400 on the solar panel 100 and can be used to report information about how much renewable energy has been created from each panel 100.

When PV cells 105 containing these power reporting modules 500 are manufactured or deployed, each trusted module 500 can be personalised with a unique digital identity so that a solar panel 100 containing these cells 105 can be uniquely identified when it is in use.

Because a solar panel 100 consists of a plurality of these cells 105, each solar panel 100 might be given a unique identity $I_x$ and secret key $K_x$ based perhaps on one cell designated as the 'master identifier'. The identity and secret key of each other power reporting module 500 could then contain this serial number plus location digit, for example 1,2,3 etc. Because this identity is deeply embedded in the structure of the PV cells 105 in tamper-resistant and/or tamper-evident silicon, it would be very hard to alter without destroying the panel 100.

There is great advantage in treating the intelligent solar panel as the equivalent of a mobile handset, as this allows ETSI ("European Telecommunications Standards Institute") and 3GPP ("3$^{rd}$ Generation Partnership Project") standards to be re-used in an innovative manner for managed renewable energy generation. The unique digital identity $I_x$ of a power reporting module 500 could be based on an International Mobile Equipment Identity ("IMEI") as specified in 3GPP Technical Standard 23.003. The IMEI (14 digits plus check digit) or IMEISV (16 digits) include information on the origin, model, and serial number of a mobile device and is used by the GSM network to identify valid devices.

Figure 11:
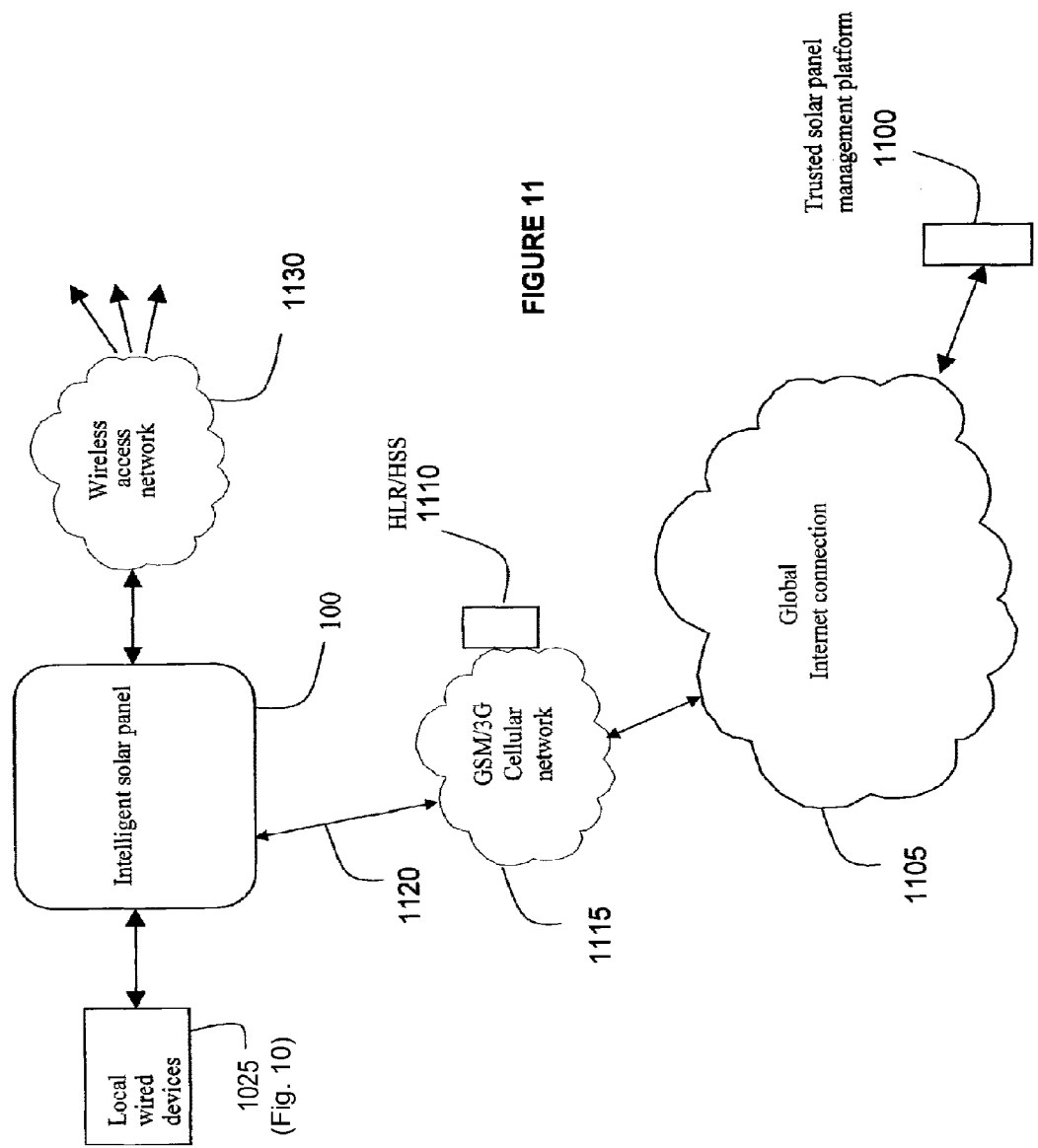
FIG. 11 shows in diagrammatic form a network environment in which embodiments of the invention might operate.

Optionally, because the processor 1000 is associated with an identity module 1010, this can provide a second, completely separate unique identifier $I_y$ and a second secret key $K_y$. This means that an intelligent solar panel 100 which includes a panel management module 400 containing this functionality may itself become a trusted platform with its own separate identity $I_y$, independent and alongside the 'master identifier' $I_x$ derived from the cells 105. This would allow information, for example received by the processor 1000 from external devices 1025 via an I/O module 1020, to be separately encrypted and transmitted onwards to a separate network based server, such as a trusted solar panel management platform 1100 as shown in FIG. 11 and further discussed below. This may provide significant benefits where an intelligent panel 100 is being used to gather data securely for or by a third party using the unique identifier $I_y$ and secret key $K_y$ where it is not desirable to divulge the unique identity $I_x$ and secret key $K_x$ to the third party.

It should be noted that the USIM 1035 is another separate and optional trusted platform specifically used to authenticate the panel to a GSM/3G mobile operator network if it is intended to 'mobile enable' the panel using the GSM module 1045. Here the International Mobile Subscriber Identity ("IMSI") number contained in the USIM is another unique identifier, this time issued by the mobile operator. In this case for security purposes either the unique intelligent PV array 100 identifier $I_x$ or $I_y$ can be locked to the IMSI. This has the benefit that a particular mobile-enabled intelligent PV array 100 can only work with a particular mobile operator subscription.

On the other hand, if a SATSA (JSR 177) is used, high speed communication between the USIM card 1035 and the processor 1000 will allow cryptographic security features running on the card 1035 owned by the mobile operator to be accessed by the software routines running on the processor 1000.

Fabrication

Figure 12:
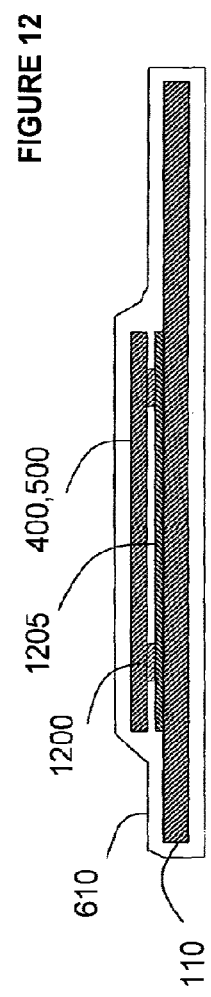
FIG. 12 shows in cross section an embedded, flip chip mounted power reporting module or panel management module for use in the solar panel shown in FIG. 4 or 6.

Referring to FIGS. 4, 6 and 12, integrated circuit techniques can be readily used to create the circuitry required in the power reporting module 500, or indeed the panel management module 400. Most of the surface area of the cell 105 is used to create the photo-voltaic p-n junction devices and the electrical connections. These are supported on the shared substrate provided in known manner by the wafer 210. The power reporting module 500 may be located at any convenient position on the same wafer 210.

Great advantage may be derived from basing the circuit topology of the power reporting module 500 on that used for ICC smart cards to create a trusted computing platform out of the power reporting module 500 as described above. ICC smart card circuits are usually fabricated using tamper-resistant or tamper evident integrated circuit technology and this can be used for the power reporting module 500, making a novel application of tamper-resistant and/or tamper-evident ICC fabrication technology. An example of a suitable fabrication process is described in U.S. Pat. No. 5,369,299. A typical manufacturer of these chips is Infineon Technologies AG based in Neubiberg near Munich, Germany.

The structures described in U.S. Pat. No. 5,369,299 are intended to prevent for example the reverse engineering of an integrated circuit by removal in turn of consecutive layers of the circuit and/or unauthorised reading of, or tampering with, data stored. In an embodiment, the integrated circuit has a passivation layer with bonding pads. A pattern of metal on the passivation layer covers some parts of the integrated circuit providing active circuitry while exposing other parts. A cap layer then encapsulates the pattern of metal, still leaving exposed some parts of the integrated circuit providing active circuitry. Openings in the cap layer allow external electrical connection to be made to the bonding pads via the pattern of metal. The material of the cap layer is chosen so that attempts to remove it will generally destroy active circuitry by damaging the passivation layer and/or elements of the circuitry, such as silicon carbide or nitride. Techniques such as plasma etching to remove the cap layer may also affect electrical charges stored in the integrated circuit. If the cap layer is successfully removed, the pattern of metal will still make inspection of the integrated circuit difficult and the metal material is chosen so that attempts to remove it are also very likely to damage the active circuitry.

Referring to FIGS. 6 and 12, in embodiments of the present invention, a tamper-resistant or tamper evident integrated circuit of the type described above, used as the power reporting module 500 (or panel management module 400), might be integrated with the p-n junction devices 105 used for power-generation (not shown in FIG. 12 but carried by the PV module 110) for instance by the known technique of flip chip mounting onto the same substrate during fabrication, by being otherwise created in situ on the same substrate, being embedded into the substrate and/or being encapsulated with the p-n junction devices 105 in the same weatherproof containment and/or physically protective material 610 such as a polymer or polymer-based coating and/or glass material.

FIG. 12 shows a cross section through a power reporting module 500 or panel management module 400 comprising a substrate 1200 carrying circuitry 1205. The substrate 1200 and circuitry 1205 have been flip chip mounted onto the PV module 110 which itself provides circuitry 1210 for connection to the circuitry 1205 of the power reporting module 500 or panel management module 400. As shown, connection is made by direct contact but in practice techniques such as wire bonds to contact pads might be employed. The PV module 110 and its flip chip mounted devices 1200, 1205 are then encapsulated in the clear polymer 610 described above.

As the power reporting module 500 is closely associated with the p-n junction devices 105 used for power-generation it can be powered from the PV cell 105 itself, and because this technology consumes very little power it will not significantly compromise the power-generating efficiency of the PV cell 105. This means that unless the power reporting module 500 is required to function when the solar cell 105 is not generating electricity, it will not require any external connections for its positive power supply and ground connections. A reset terminal for initialising the CPU 900 and a clock terminal for receiving an external clock signal however may be required and might for example be connected to the digital management controller 820 of the panel management module 400 on the solar panel 100 in a suitable manner.

The panel management module 400 can be fabricated in the same manner as the power reporting module 500. However, it is supported on the backing panel 140 of the solar panel 100 as a substrate shared with the PV cells 105 rather than on a wafer 210 of a PV cell 105.

Use of the Invention

A key inventive step described in the above embodiment is to embed one or more secure processors into a solar panel 100 so it becomes a trusted platform which can be used to 'self certify' the amount of electricity it has produced. The embedded communications circuits allow such a panel 100 to be remotely managed and monitored as well as becoming part of an integrated communications network. Furthermore the embedded GPS receiver 1060 allows the location of the panel 100 from which the renewable energy is being produced to be recorded. "Embedded" in this context means for example being mounted onto or into the panel 100 by use of known semiconductor chip technologies, such as by bonding. In practice, this will also usually mean containment in the same weatherproof coating 610 as the panel 100.

By using a very high level of integration the intelligent solar panel 100 becomes essentially a single component. This will have significant advantages in terms of reliability and ease of use in the field.

Referring to FIG. 11, the panel management module 400 on the panel 100 can be configured as a 'thin client', linked to a network-based server providing a trusted solar panel management platform 1100. Local wired devices 1025 (e.g., devices shown in FIG. 10) also may be connected to panel 100. From a communications perspective there are several options for a secure connection to the trusted solar panel management platform 1100 using both fixed and radio networks. The arrangement shown in FIG. 11 is just one example where an 'always on' cellular data connection 1120 is used for the intelligent solar panel 100 to access the Internet 1105.

A local wireless access network 1130 could use either licensed or unlicensed spectrum for the radio bearer or for that matter any combination. The same goes for the data connection 1120 for internet access and this flexibility allows the intelligent solar panel 100 to accommodate different technical and commercial architectures according to circumstances, or perhaps new ones based on a combination of old and new ideas.

An intelligent solar panel 100 will now be described as part of a GSM or UMTS cellular device for communicating over a network run by a MVNO ("Mobile Virtual Network Operator"). A publication covering MVNOs was written by Michelle de Lussanet et al under the title "Should You Become An MVNO?" and published by Forrester Research in September 2001. A MVNO is generally a service provider who enters a commercial agreement with a licensed mobile operator. In the context of the present invention, the service provider for example operates the intelligent solar panels 100 in a particular region. The intelligent solar panel 100 is essentially the equivalent of a mobile handset activated by a 'mobile subscription' linked to a USIM 1035. To reduce the number of these subscriptions to a manageable level, it may be appropriate for only one panel 100 in an installation to be 'mobile enabled' with other panels securely linked to it via their radio modules 1050, 1055 or I/O module 1020. This enabled panel 100 then acts as a secure communications node for the whole installation.

The USIM card 1035 (either slotted in or hard wired) and the GSM module 1045 manage the device MVNO GSM/3G mobile subscription. At power-up the panel 100 will be automatically authenticated to a cellular network 1115 in a similar manner to a mobile phone. Secure credentials programmed into the USIM card include a secret key "$K_i$" and the International Mobile Subscriber Identity ("IMSI") number. This is in effect a unique user name which is checked with the account details held on the mobile operator's Home Location Register ("HLR"), or the 3GPP version called the Home Subscriber Subsystem ("HSS") 1110.

It should be noted that the GSM/3GPP cellular network 1115 is only used as an access network and the mobile operator's HLR/HSS 1110 may not be required to take part in the secure management of the intelligent solar panels 100.

The solar panel 100 is configured as a thin client, linked to a trusted solar panel management platform 1100 via the Internet 1105 reached by an Internet access connection 1120. The management platform 1100 contains a database of every deployed intelligent solar panel 100, cross-referenced to the embedded identity $I_x$ and/or $I_y$ and stored at the power reporting module 500 on each solar cell 105. It also contains details of registered locations, cross-referenced with a regular encrypted location fix obtained by the embedded GPS receiver 1060. This allows techniques normally employed to disable stolen mobile phones to be used. If a panel 100 is moved without a similar change to the location entry in the management platform 1100, for example if stolen, an intelligent solar panel 100 could register itself on a stolen 'grey' list and perhaps adopt a different operating mode. This includes disabling the power generation capability.

One function of the client software running on the processor 1000 of the additional functions 815 can include reporting how much electricity has been generated without the power from the panel 100 having to pass through a separate meter. This could then support trusted processes such as the automatic awarding of 'carbon credits' in accordance with how much renewable electricity had been generated. The panel management module 400 thus can be viewed as a secondary security module for create trusted metering data.

This new family of solar panels 100 can also provide additional spin-offs which could include the provision of public or private radio-based communications infrastructure and peripheral services such as centrally managed solar-powered lighting.

Other Aspects of the Exemplary Embodiments

Although the embodiments described herein relate to first generation PV arrays based on monocrystalline silicon substrates, the same result can be achieved for second or third generation devices based on thin film or amorphous silicon or compound semiconductor devices. In this case the power reporting module 500 can be embedded in the PV array using hybrid semiconductor techniques. It can still be powered from the PV cell itself.

Furthermore, the trusted functionality and communications features of the power reporting module 500 and the management module 400 may be used in other forms of renewable energy generation to achieve the same result. For example, a wind (or water) turbine or solar thermal panel might similarly contain a tamper-resistant and/or tamper-evident power reporting module 500 built deeply into the construction of the device which would be very hard to alter without destroying it.

In embodiments of the invention described above, the power reporting module 500 and the management module 400 are described separately. However, the functions of these two modules could be differently distributed. For example, the power reporting module might be configured as the thin client referred to above. Also for example, the functions of the two modules 400, 500 might be combined in one module, constructed as a single integrated, hybrid or printed circuit.

A key benefit of embodiments of the invention is that unauthorised tampering with any element of the secure hardware, such as the power reporting module 500 or any component of it, or anything associated with it, could trigger automatic security behaviour of the panel and/or attributes of information transmitted by it. For example, power generating properties of the panel might be partially or fully disabled or a signal might be sent to a backend server to trigger an alert.

What is claimed is:

1. A solar power conversion device comprising a solar cell or panel for receiving solar radiation and converting it to an electrical output, the solar cell or panel being connected to at least one other such solar cell or panel and having embedded therein:
   i) a current sensor;
   ii) a voltage sensor;
   iii) an analog to digital converter; and
   iv) a digital metering controller;
   wherein the current sensor and the voltage sensor are connected to deliver outputs to the analog to digital converter, and the analog to digital converter is configured to provide an output to the digital metering controller, to provide metering data comprising the amount of electrical power generated by the solar cell or panel;
   the solar cell or panel further having embedded therein;
   v) an information processing device configured to associate security information including a unique digital identity with the metering data to create trusted and identifiable metering data; and
   vi) a metering output for delivering the trusted and identifiable metering data from the solar cell or panel, and wherein
   the information processing device comprises a security module configured to associate the security information with the metering data to create the trusted and identifiable metering data for delivery by the metering output, and
   the solar power conversion device is connected to at least one other such device and the solar cell or panel has embedded therein a management module connected to receive trusted metering data from at least one security module and to deliver data to the metering output.

2. A solar power conversion device according to claim 1, wherein the metering output is adapted for connection to a communication link such as a wireless interface to a network connection.

3. A device according to claim 2, further comprising a receiver, the or each information processing device and/or management module being arranged to respond to incoming communications such that the device can be managed remotely, via a communication link.

4. A solar power conversion device according to claim 1 wherein the elements are mounted on or in a shared substrate.

5. A solar power conversion device according to claim 4 wherein the solar cell or panel, the analog to digital converter, the digital metering controller and the information processing device together provide an integrated circuit.

6. A solar power conversion device according to claim 1, comprising a solar panel where said solar panel comprises an array of solar cells, each cell having embedded therein elements (i) to (vi).

7. A solar power conversion device according to claim 1, wherein the elements (i) to (vi) are sealed within a same weatherproof containment together with the solar cell or panel.

8. A solar power conversion device according to claim 1, wherein the elements (i) to (vi) are connected by means of permanent electrical connections.

9. A solar power conversion device according to claim 1, wherein elements (i) to (vi) are connected by conductors constructed by semiconductor fabrication and/or assembly techniques on or in a shared substrate.

10. A solar power conversion device according to claim 1 wherein the security module comprises a trusted module arranged to generate trusted digital certificates in relation to the metering data.

11. A solar power conversion device according to claim 1, wherein the security module comprises an integrated circuit card chip.

12. A solar power conversion device according to claim 1, wherein the management module comprises a subscriber identity module function for use in communicating over a mobile telephone network.

13. A solar power conversion device according to claim 1, wherein the management module is connected to receive trusted metering data from more than one security module and is arranged to collate such data prior to delivering it to the metering output.

14. A solar power conversion device according to claim 1, wherein the information processing device, and/or the management module, is configured as a secure thin client linked to a server over a secure network.

15. A solar power conversion device according to claim 1, further comprising a location sensitive arrangement.

16. A solar power conversion device according to claim 15, the security module, in use, being connected over a network to a management platform comprising a database for holding registered panel locations, the device being adapted to register itself as stolen or adopt a different operating mode if moved without a similar change to the registered panel location.

17. A solar power conversion device according to claim 1 having connected thereto a transducer for generating data in relation to a measurable external variable for onward transmission as trusted measured data by use of one or both of the security module and the management module.

18. A solar power conversion device according to claim 1, the solar cell or panel having an embedded substrate carrying integrated circuit components, the components comprising:
   i) at least one sensor;
   ii) the analog to digital converter; and
   iii) the digital metering controller;
   wherein the security module comprises a tamper-resistant or tamper-evident security module.

19. A solar power conversion device according to claim 1, wherein the security module is adapted, in the event of unauthorized tampering, to trigger automatic security behavior of the solar power conversion device and/or attributes of information transmitted by it.

20. The solar power conversion device of claim 19 wherein the automatic security behavior of the solar power conversion device and/or attributes of information transmitted by it comprises partial or full disablement of power generating properties of the solar power conversion device and/or the sending of a signal to trigger an alert.

21. The solar power conversion device of claim 1 wherein the digital metering controller comprises the information processing device.

22. The solar power conversion device of claim 1 wherein the output of digital metering controller comprises a digital, coded power measurement reading.

23. A solar power conversion device according to claim 1 wherein the security module comprises a trusted module arranged to provide any one or more of data storage, tamper detection, key pair husbandry, identification, authentication, and encryption of uplink data streams.

24. The solar power conversion device of claim 1 wherein the information processing device comprises the metering output.

* * * * *